United States Patent [19]
Bazinet et al.

[11] Patent Number: 5,847,942
[45] Date of Patent: Dec. 8, 1998

[54] CONTROLLER FOR ISOLATED BOOST CONVERTER WITH IMPROVED DETECTION OF RMS INPUT VOLTAGE FOR DISTORTION REDUCTION AND HAVING LOAD-DEPENDENT OVERLAP CONDUCTION DELAY OF SHUNT MOSFET

[75] Inventors: John P. Bazinet, Concord; John A. O'Connor; Dhaval B Dalal, both of Merrimack, all of N.H.

[73] Assignee: Unitrode Corporation, Merrimack, N.H.

[21] Appl. No.: 865,023

[22] Filed: May 29, 1997

Related U.S. Application Data

[60] Provisional application No. 60/018,647 May 30, 1996.
[51] Int. Cl.⁶ .................................................. H02M 3/335
[52] U.S. Cl. ................................... 363/25; 363/97; 363/40
[58] Field of Search .......................... 363/97, 133, 134, 363/40, 25

[56] References Cited

U.S. PATENT DOCUMENTS

| | | | |
|---|---|---|---|
| 3,938,024 | 2/1976 | Clarke | 321/2 |
| 4,388,578 | 6/1983 | Green et al. | 318/729 |
| 4,645,997 | 2/1987 | Whited | 323/211 |
| 4,672,298 | 6/1987 | Rohatyn | 323/208 |
| 4,876,517 | 10/1989 | Arcus | 330/277 |
| 4,920,474 | 4/1990 | Bruning et al. | 363/97 |
| 4,956,760 | 9/1990 | Gulczynski | 363/16 |
| 5,003,454 | 3/1991 | Bruning | 363/81 |
| 5,006,975 | 4/1991 | Neufeld | 363/80 |
| 5,055,721 | 10/1991 | Majumdar et al. | 307/570 |
| 5,221,850 | 6/1993 | Sakurai | 257/173 |
| 5,262,932 | 11/1993 | Stanley et al. | 363/26 |
| 5,267,132 | 11/1993 | Gulxzynski | 363/16 |
| 5,341,004 | 8/1994 | Furuhata | 257/139 |
| 5,349,284 | 9/1994 | Whittle | 323/207 |
| 5,351,178 | 9/1994 | Brennen et al. | 363/40 |
| 5,363,020 | 11/1994 | Chen et al. | 315/209 R |
| 5,378,903 | 1/1995 | Otsuki et al. | 257/133 |
| 5,381,025 | 1/1995 | Zommer | 257/138 |
| 5,442,540 | 8/1995 | Hua et al. | 363/98 |
| 5,444,591 | 8/1995 | Chokhawala et al. | 361/18 |
| 5,446,366 | 8/1995 | Bassett et al. | 323/222 |
| 5,450,029 | 9/1995 | Jacobs et al. | 327/348 |
| 5,461,263 | 10/1995 | Helfrich | 307/64 |
| 5,465,203 | 11/1995 | Bhattacharya et al. | 363/40 |
| 5,475,333 | 12/1995 | Kumagai | 327/530 |
| 5,486,752 | 1/1996 | Hua et al. | 323/222 |

OTHER PUBLICATIONS

E.X. Yang, Y.M. Jiang, G.C. Hua, and F.C. Lee, *Isolated Boost Circuit for Power Factor Correction*, VPEC 1992, pp. 97–104.

L.H. Dixon, Jr., *High Power Factor Preregulators for Off–line Power Supplies*, Unitrode Seminar (SEM 600), pp. 12–1–12–16.

*Primary Examiner*—Shawn Riley
*Attorney, Agent, or Firm*—Weingarten, Schurgin, Gagnebin & Hayes LLP

[57] ABSTRACT

A power factor correction controller is disclosed which extracts RMS information from a rectified AC input line voltage signal using a sample and hold analog to digital conversion approach. The controller then processes a digital word representing the RMS information through the application of a programmable mathematical function. The result is converted to analog form and provided as an input to an analog multiplier. The controller also monitors the output load power of an isolated boost converter circuit and linearly reduces the overlap delay time of a MOSFET transition switch when the load power decreases.

21 Claims, 7 Drawing Sheets

CONTROLLER FOR ISOLATED BOOST CONVERTER WITH IMPROVED DETECTION OF RMS INPUT VOLTAGE FOR DISTORTION REDUCTION AND HAVING LOAD-DEPENDENT OVERLAP CONDUCTION DELAY OF SHUNT MOSFET

CROSS REFERENCE TO RELATED APPLICATION

This application claims priority under 35 U.S.C. §119(e) of U.S. Application No. 60/018,647 filed May 30, 1996.

BACKGROUND OF THE INVENTION

Active power factor correction (PFC) is being increasingly employed in switching power converters for various applications. This trend is driven by the regulatory requirements of low input harmonic distortions as well as the need to get maximum real power from a given AC outlet. Another significant trend in the power conversion industry in recent years has been the advent of distributed power systems and the standardization around 48V as the distribution bus. A 48V distribution bus provides a ready interface to battery backup systems as well as the highest "safe" voltage for minimizing the currents flowing in the distribution bus. The telecommunication industry has been the driving force behind this standardization as it has been using 48V systems for a number of years.

The major outcome of these recent trends has been that many power conversion systems are compartmentalized into two distinct stages. Referring to FIG. 1, there is shown a power conversion system 10 having first stage converters 12 for accomplishing the tasks of power factor correction along with the generation of an isolated voltage for a distribution bus 14. A second stage 16 consists of local DC-DC converters 18 working off the distribution bus voltage which address local load requirements.

Traditional first stage converters for a distributed power bus (e.g., 48V) have involved 2-step power conversion comprising a PFC boost converter 20 and a step-down converter with isolation 22. While this approach is accepted because it provides functional optimization and good energy storage, it involves two power processing steps and associated complexity and loss in efficiency.

Alternatively, an isolated boost converter 24, first introduced by P. W. Clarke in U.S. Pat. No. 3,938,024, issued Feb. 10, 1976, and entitled "Converter Regulation by Controlled Conduction Overlap", simplifies the converter design by eliminating one process step while still offering isolation and voltage step-down by the use of transformer turns ratio. There is also the potential for efficiency improvement presented due to reduced component count in the power path. Flyback and SEPIC converters can also offer single stage power factor correction with isolation, but their applications are limited to low power levels for the reasons of high peak current and voltage stresses.

Most active PFC converters, including the Clarke, flyback, and SEPIC converters mentioned above, convert a full bridge rectified AC input line voltage to a regulated and isolated DC output voltage. The primary goal of these converters is to reduce the harmonic content of the AC line current. This goal is accomplished by forcing the line current to track the line voltage, thereby causing the input impedance of the converter to appear purely resistive.

Optimal total harmonic distortion (THD) reduction requires that a controller, either discrete or monolithic, maintain the gain of a voltage feedback loop constant as the RMS value of the input line voltage changes. Otherwise, a gain variation of approximately 10 to 1 can occur over the full range of international AC line voltages and cause line current distortion.

Prior art techniques of line voltage compensation have employed an external two pole filter, in conjunction with an analog squaring function, the result of which is divided into the product of the instantaneous line voltage and a DC power command. This technique has an inherent trade off between THD reduction and response time to line voltage variations. A faster response time through the filter, which is desirable, increases the 120 Hz ripple riding on the average DC level. This is an error term that is subsequently squared and input as the divider term in a multiplier. The result is a 3rd harmonic distortion in the input current waveform. Accordingly, it would be desirable to provide a power factor correction controller which overcomes the shortcomings of these prior art techniques while providing other key enhancements.

BRIEF SUMMARY OF THE INVENTION

The present invention contemplates a power factor correction controller which extracts RMS information from a rectified AC input line voltage signal using a novel sample and hold analog to digital conversion approach. The controller then processes a digital word representing the RMS information through the application of a programmable mathematical function. The result is converted to analog form and provided as an input to an analog multiplier. This technique improves the response time of the feed forward gain path of an isolated boost converter circuit by approximately 6 times (e.g., 60 Hz vs. 10 Hz), in addition to eliminating an external two pole passive filter. The mathematical function performed on the RMS information is mask selectable, and can be optimized for different line conditions.

When the present invention controller is used to control an isolated boost converter, commonly referred to as a "Clarke" converter, the controller is configured to drive two IGBT power transistors as main power switches, and one MOSFET switch which is used to ensure zero current transition switching for the IGBT power transistors. The IGET power transistors are favored for high power applications because of their lower conduction losses and lower cost (higher power density) compared to MOSFET's. Overlapping conduction phases of the IGBT power transistors define the charging phase of the isolated boost converter. The drawback of IGBT power transistors is a long turn-off current tail. This limits the usable operating frequency generally to below 20 kHz, in order to keep switching losses low. Thus, a technique which employs a MOSFET switch that is shunted across the IGBT power transistors can be employed. This technique increases the usable frequency range of IGBT power transistors to as high as 100 kHz. Higher switching frequencies allow the size of the magnetic components in the boost converter to be reduced, thereby reducing required area and cost. Applying this technique to an active PFC circuit results in an efficient single stage PFC and step down voltage converter.

A drawback of previous isolated boost converters is a fixed MOSFET conduction overlap delay, generally on the order of 1 to 2 usec. While this is beneficial when the input line current is high (i.e., heavy load, low line), it introduces significant distortion to the AC line current during moderate and light load conditions when the input RMS voltage is high. This is because the conduction delay of the MOSFET switch extends the effective duty ratio of the converter beyond the overlap conduction period of the IGBT power transistors. This becomes a problem when the control loop wants to command a duty ratio lower than the conduction delay of the MOSFET switch. When this occurs, the control loop overshoots trying to correct, thus causing a discontinuity in the input line current.

The present invention controller monitors the output load power and linearly reduces the overlap delay time when the load power decreases. By reducing the overlap time of the MOSFET switch under these conditions, reduction of the turn off losses of the IGBT power transistors is not compromised because the input line current is low, and the distortion is greatly reduced.

BRIEF DESCRIPTION OF THE DRAWINGS

The foregoing features of this invention, as well as the invention itself, may be more fully understood from the following detailed description of the drawings in which.

DETAILED DESCRIPTION OF THE INVENTION

Figure 1:
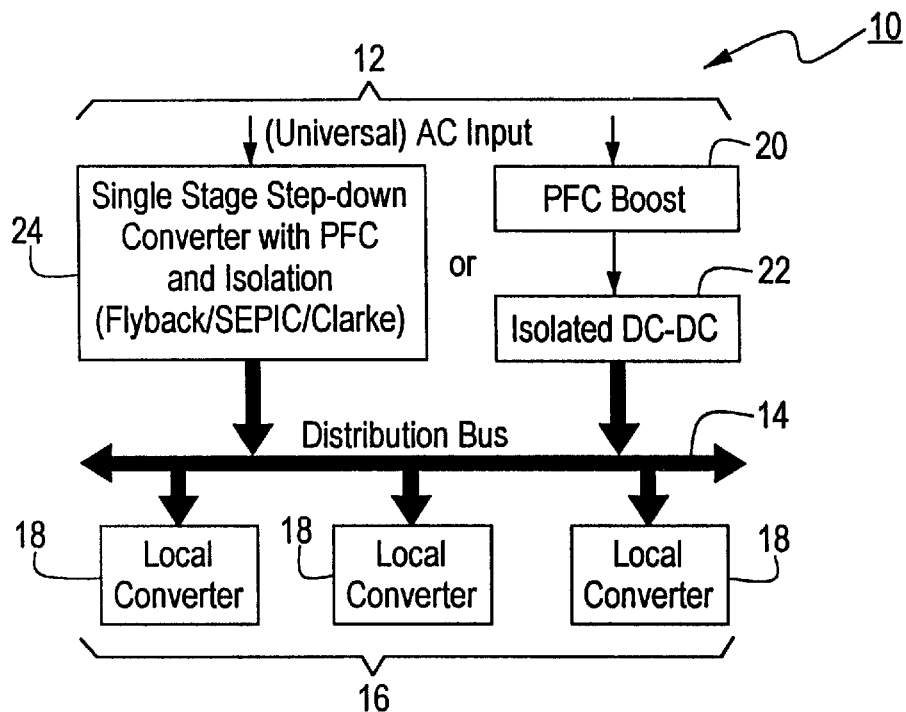
FIG. 1 is a prior art power conversion system having first stage converters for accomplishing the tasks of power factor correction along with the generation of an isolated voltage for a distribution bus.
Figure 2:
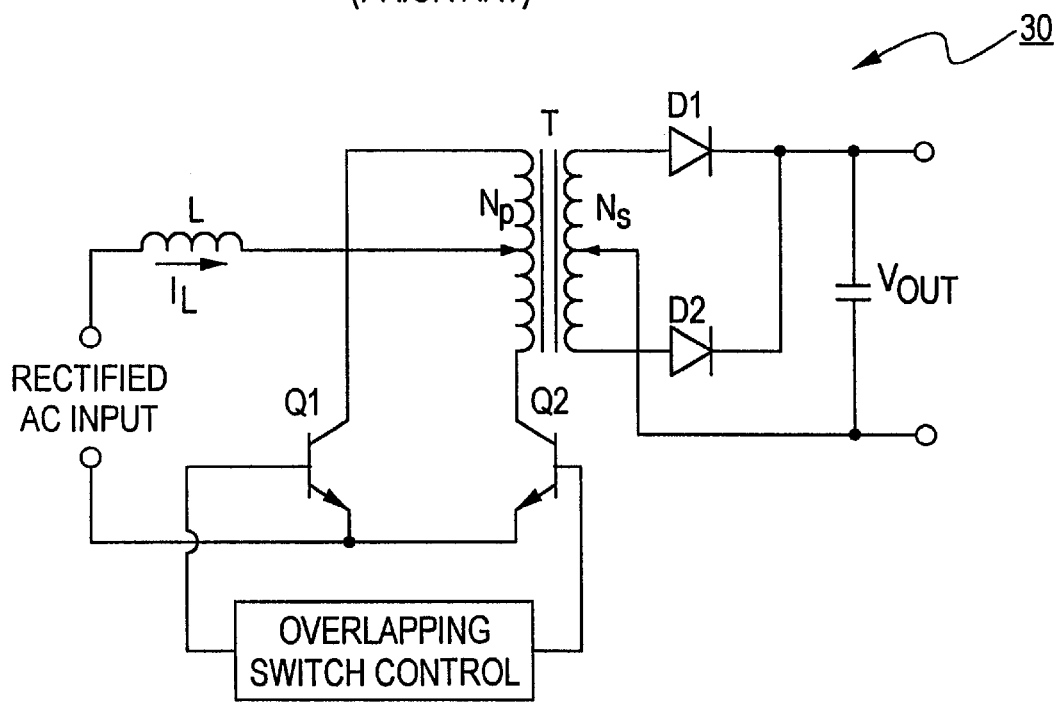
FIG. 2 is a prior art isolated boost converter circuit.

Referring to FIG. 2, there is shown a conventional implementation of an isolated boost converter circuit 30. This boost converter circuit 30 has a front-end inductor L, similar to a boost inductor, which is "charged" when both of switches Q1 and Q2 are on simultaneously. When one of the switches Q1 or Q2 is turned off, a corresponding output rectifier D1 or D2 turns on enabling the energy from the inductor L to be transferred to the output $V_{OUT}$. The two switches Q1 and Q2 are alternately turned off to provide push-pull action and automatic core flux balance. It can be easily seen that while the basic operation of this circuit 30 closely resembles the operation of a boost converter, it provides the added versatility of being able to program the output voltage independently of the input voltage range by scaling the turns ratio of a transformer T. The presence of the input inductor L yields the opportunity to program the input current $I_L$ to follow the shape of the input voltage and achieve a high power factor, while the isolation transformer T allows the output voltage level to be programmed at a distributed bus voltage level. These features make this circuit 30 an ideal candidate for a single stage front-end converter with PFC for distributed power applications.

However, certain practical limitations of this circuit 30 have to be addressed to ensure its usefulness in such applications. Like all other PFC converters, the output voltage regulation of the isolated boost converter circuit 30 is generally not as good as what can be achieved with 2-stage conversion. However, it is generally acceptable to have loose regulation for the distributed bus voltage (i.e., 48V) as the downstream point of load converters are expected to tolerate variations in voltage. This approach also requires a higher voltage rating on the two switching elements Q1 and Q2. The voltage stress seen by the switches Q1 and Q2 is greater than twice the maximum line voltage, and can be above 800V for a universal input voltage range. While power MOSFET's are generally acknowledged to be better switching devices for power conversion applications, their price to performance ratio deteriorates quickly at such high voltage levels. With the recent advances in power device technology, IGBT's prove to be ideal components for such high voltage applications. One limiting factor for IGBT's is their slow turn-off characteristics. It has been shown by E. X. Yang, Y. M. Jiang, G. C. Hua, and F. C. Lee in "Isolated Boost Circuit for Power Factor Correction", VPEC 1992, pp. 97–104, that with the addition of a faster MOSFET (of lower current and voltage rating) and appropriate timing control, the turn-off of IGBT's can be carried out with zero voltage thereacross, thereby eliminating turn-off losses and allowing the IGBT's to be operated at higher switching frequencies. The MOSFET carries current only during the transition period and can be sized to be much smaller than the IGBT's. This technique improved the converter efficiency by approximately 2–5% for a 400 W DC-DC application. The critical issue of timing control for the switches Q1 and Q2 can be addressed with certain novel control techniques.

Figure 3:
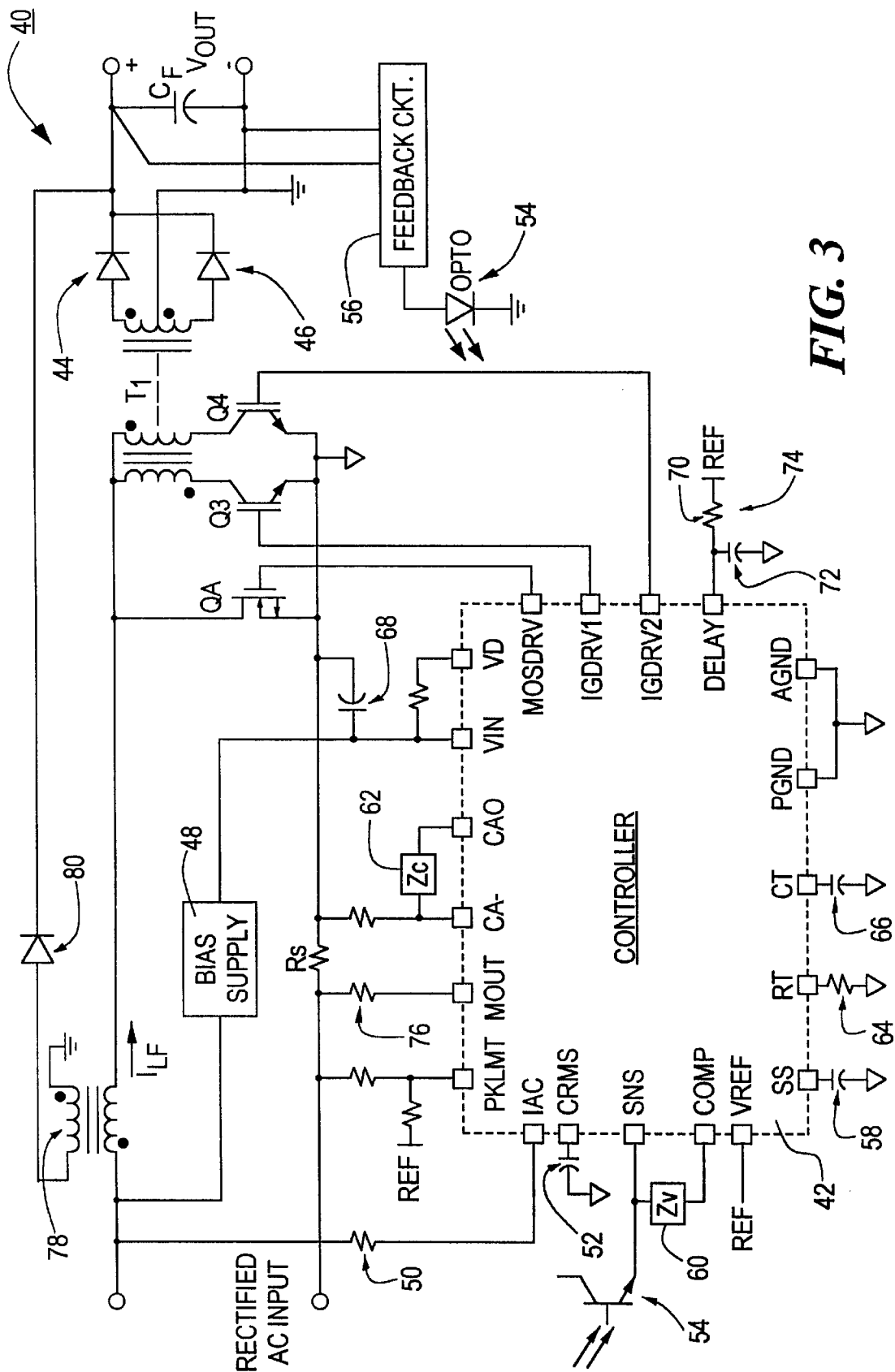
FIG. 3 is an isolated boost converter circuit having a controller for providing isolated boost power factor correction with zero current transition switching in accordance with the present invention.
Figure 4:
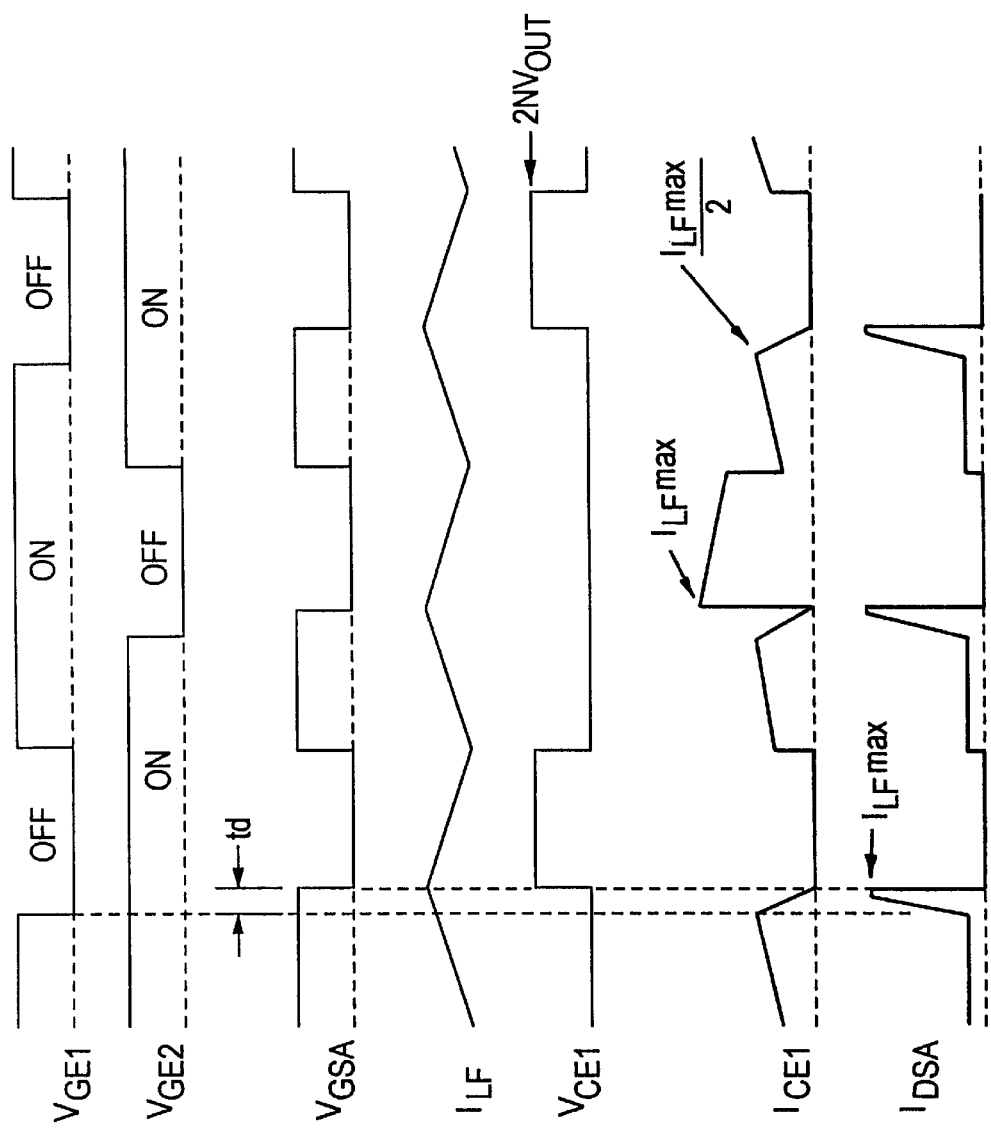
FIG. 4 shows the operating waveforms for the isolated boost converter circuit shown in FIG. 3.

Referring to FIG. 3, there is shown a modified converter circuit 40 depicting the use of the present invention soft-switching isolated boost approach with power factor correction. A novel controller 42 provides all of the control functions needed for the implementation. Operating waveforms for the converter circuit 40 are shown in FIG. 4.

Both of the switches Q3 and Q4 are IGBT's, and switch QA is a MOSFET. When switches Q3 and Q4 are both on, an input inductor LF is charged. When one of the switches Q3 or Q4 is off (along with QA), energy stored in the input inductor LF is transferred through transformer T1 to the output $V_{OUT}$ through output diode 44 or output diode 46, respectively. The two switches Q3 and Q4 are alternately turned off to achieve transformer reset every cycle. The timing of the MOSFET switch QA is adjusted so that it turns on with each IGBT and stays on for a programmed delay (td) after an IGBT has been turned off. During the delay, the current transfers from the IGBT's to the MOSFET as shown in FIG. 4 (while the inductor LF continues to charge up). The current in both IGBT's reduces slowly due to the inherent current tail as shown, but keeping the MOSFET on during this period allows lossless IGBT turn-off.

The converter circuit 40 also includes a bias supply 48, a coupling resistor 50, a coupling capacitor 52, an opto-coupler 54, a feedback circuit 56, a soft start capacitor 58, a feedback impedance 60, a feedback impedance 62, a coupling resistor 64, a coupling capacitor 66, an RC low pass filter 68, a coupling resistor 70, a coupling capacitor 72, a coupling resistor 76, a transformer winding 78, and a diode 80. The function of these devices will be described in detail below.

Figure 5:
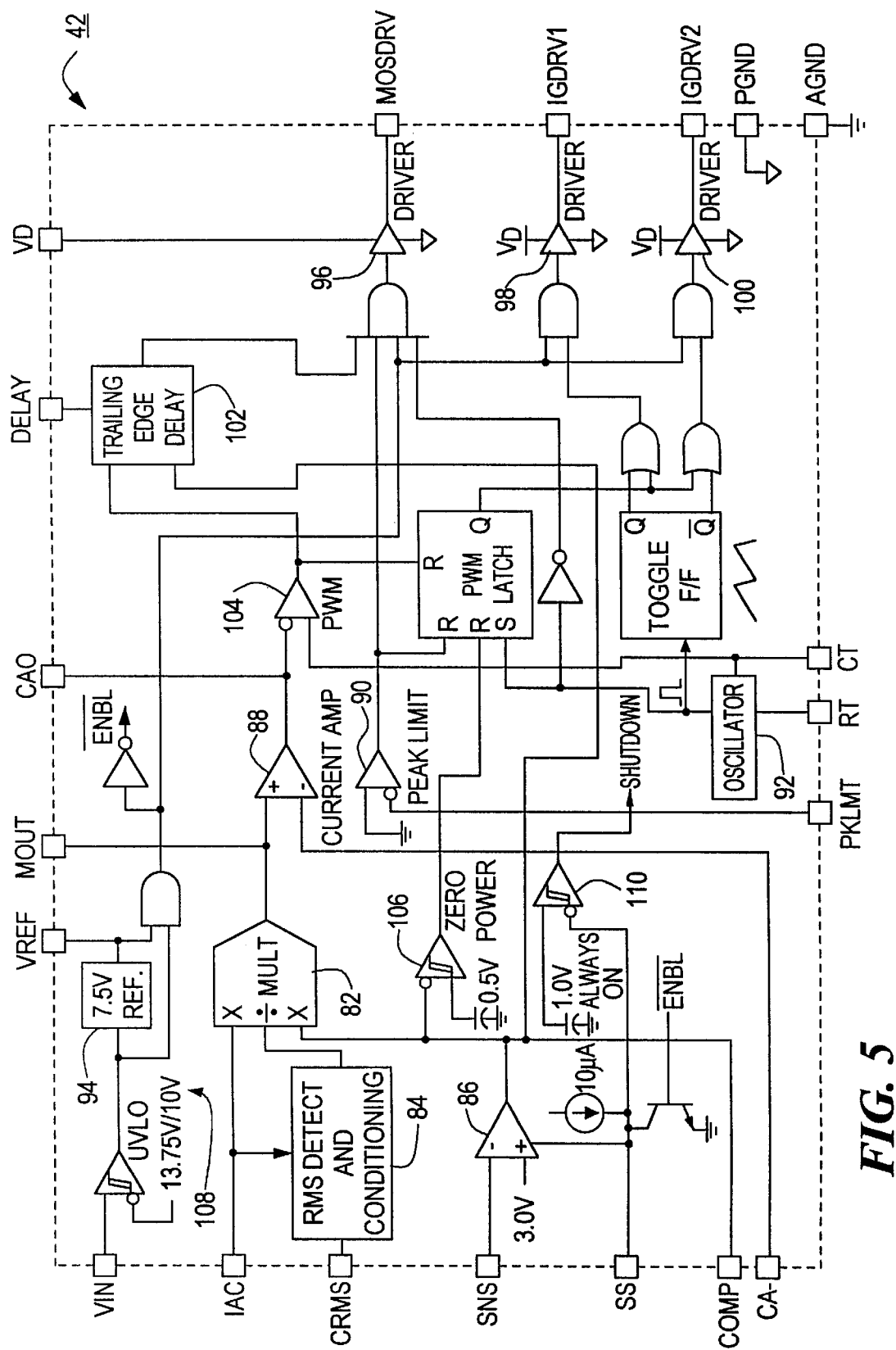
FIG. 5 is a detailed block diagram of the controller shown in FIG. 3.

The controller 42 is a monolithic control solution for isolated boost PFC with Zero Current Transition switching (ZCT). Referring to FIG. 5, there is shown a detailed block diagram of the controller 42. The controller 42 is preferably fabricated with a combination of dense CMOS logic, precision bipolar elements, and power DMOS output drivers. It employs a fixed frequency average current inner control loop for accurate tracking of the input line current with a generated reference signal. An outer low bandwidth voltage loop regulates the output $V_{OUT}$. While similar in function to previous PFC controllers, several distinct features of this controller 42 allow for greater power system integration, improved performance, and higher efficiency over other approaches.

The controller 42 has multiple inputs and outputs for performing its necessary functions. For instance, the VIN input provides a supply voltage to the controller 42 from the bias supply 48. The supply voltage level is preferably limited to less than 18 VDC. The controller 42 is enabled when the supply voltage level at the VIN input exceeds 13.75V (nominal).

The IAC input is typically resistor coupled to the rectified AC input line voltage through resistor 50. The IAC input provides an internal analog multiply and divide circuit 82 and an internal RMS detect and conditioning circuit 84 with instantaneous line voltage information. The RMS value detected by the RMS detect and conditioning circuit 84 may be multiplied by an internal multiplying DAC (see FIG. 7).

The CRMS input is capacitor coupled to ground through capacitor 52 to average the AC line voltage over a half cycle. The CRMS input is internally connected to the RMS detector 84.

The SNS input is a feedback input for the outer voltage control loop. The external opto-coupler 54 and feedback circuit 56 provide output voltage regulation information to the SNS input across an isolation barrier.

The SS input is capacitor coupled to ground through soft start capacitor 58 to provide the controller 42 with a soft start feature. The voltage on the COMP input, discussed below, is clamped to approximately the same voltage as the SS input. An internal 10 uA (nominal) current source is provided by the controller 42 to charge the soft start capacitor 58.

The COMP output is the output of an internal voltage loop error amplifier 86. The COMP output is internally clamped to approximately 5.6V by the controller 42 and can swing as low as approximately 0.1V. Voltages below 0.5V on COMP output will disable the MOSDRV output and force the IGDRV1 and IGDRV2 outputs to a zero overlap condition. The COMP output is coupled to the SNS input through a feedback impedance 60.

The CA– input is the inverting input of an internal inner current loop error amplifier 88. The CA– input is coupled to the CAO output, discussed below, through a feedback impedance 62.

The PKLMT input is the inverting input to an internal peak current limit comparator 90. The threshold for the peak current limit comparator 90 is nominally set to 0 volts. The peak current limit comparator 90 terminates the MOSDRV, IGDRV1, and IGDRV2 outputs when tripped.

The RT input is resistor coupled to ground through resistor 64 to set the charging current for an internal ramp generator 92. The controller 42 provides a temperature compensated 3.0V at RT. The oscillator charging current of the ramp generator 92 is therefore 3.0V divided by the value of resistor 64. The current out of the RT input should be limited to 250 uA for best performance.

The CT input is capacitor coupled to ground through capacitor 66 to set the switching frequency of the ramp generator 92 in conjunction with the RT input. Capacitor 66 is preferably a low ESR, ESL capacitor. The frequency of the ramp generator 92 is approximately equal to 0.67 divided by the value of the product of the value of resistor 64 and the value of capacitor 66.

The AGND input provides a reference point for an internal voltage reference 94 and all thresholds, as well as the return for the remainder of the controller 42, except for several internal output drivers 96, 98, 100.

The PGND input provides a return for all high level currents internally tied to the output driver stages of the controller 42.

The IGDRV1 output is the driver output for the external IGBT power switch Q3. The IGDRV2 output is the driver output for the external IGBT power switch Q4. The MOSDRV output is the driver output for the external MOSFET power switch QA. The VD input provides a positive supply rail for the three output driver stages. The voltage applied to the VD input should be limited to less than 18VDC. The VD input should be bypassed to the PGND input with a 0.1 to 1.0 uF low ESR, ESL capacitor for best results. The VD input and the VIN input can be isolated from each other with an RC low pass filter 68 for better supply noise rejection.

The DELAY input is resistor coupled to the VREF output through resistor 70, and is capacitor coupled the AGND input through capacitor 72. The resultant RC filter 74 provides an overlap delay time for a trailing edge delay circuit 102 and for the MOSDRV output stage. The overlap delay function can be disabled by disconnecting capacitor 72 from the AGND input.

The CAO output provides the output of the inner current loop error amplifier 88. This output can swing between approximately 0.1V and the value at the VREF output. It is one of the inputs to an internal PWM comparator 104.

The MOUT output provides the output of the internal analog multiply and divide circuit 82. The MOUT output is resistor coupled to the return leg of the input bridge through resistor 76. The resultant waveform on the MOUT output forms a sine reference for the current error amplifier 88.

The VREF output provides a precision 7.5V reference voltage. A 0.01 to 0.1 uF low ESR, ESL bypass capacitor is recommended between the VREF output and the AGND input for best performance.

Traditional PFC controllers employ an analog RMS voltage feed forward function as part of an analog computation unit (ACU) to maintain a constant gain in the outer voltage regulation loop (see L. Dixon, "High Power Factor Preregulators for Off-line Power Supplies", Unitrode Seminar (SEM-600)). The RMS term must be squared by the ACU in order to provide optimal gain linearity. Without this function, the voltage loop gain would vary with the square of the input line RMS voltage, or approximately 10:1 over a universal input voltage range of 85 to 265VAC. The ACU transfer function typically employed is:

$$I_{mult} = \frac{V_{err}I_{AC}K}{V_{rms}^2}$$

$I_{mult}$=ACU output current (current loop reference).
$V_{err}$=voltage amplifier output (load current command, input to ACU).
$I_{AC}$=rectified AC input voltage reference (input to ACU).
K=ACU gain constant.
$V_{rms}$=averaged value of the rectified input line voltage (input to ACU).

Figure 6:
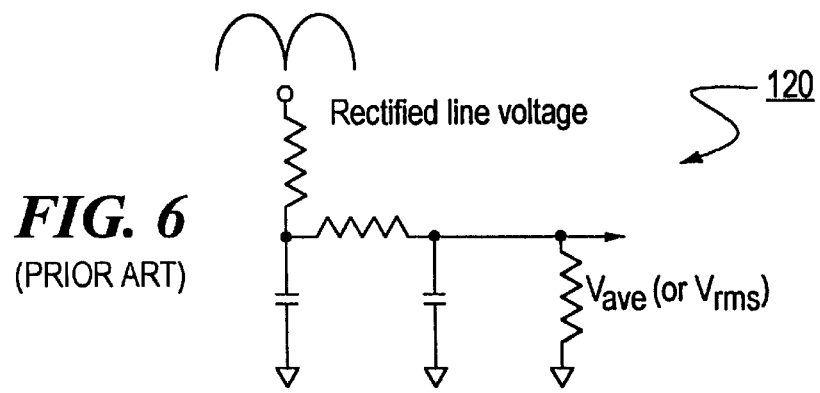
FIG. 6 is a prior art two stage low pass filter for averaging incoming rectified AC line voltage.

The input line voltage is averaged to extract a DC voltage which is proportional to its RMS value for a sinusoidal input. This is traditionally accomplished with a two stage low pass filter 120 off of the incoming rectified AC line, as shown in FIG. 6. The filter output has a 120 Hz ripple imposed on its average DC level which is out of phase with the AC input. Since this voltage will be squared by the internal circuitry of the controller 42, attenuation of the 120 Hz ripple is crucial in order to reduce the third harmonic distortion in the resultant line current waveform. The limitation with the low pass filter technique is its inherent trade-off between reduction in ripple and providing adequate response time to changes in the input line RMS value. Typical implementations place a cut-off frequency for the filter around 10 Hz. Lower cutoff frequencies can reduce the THD at the expense of a slower responding feed forward path.

Figure 7:
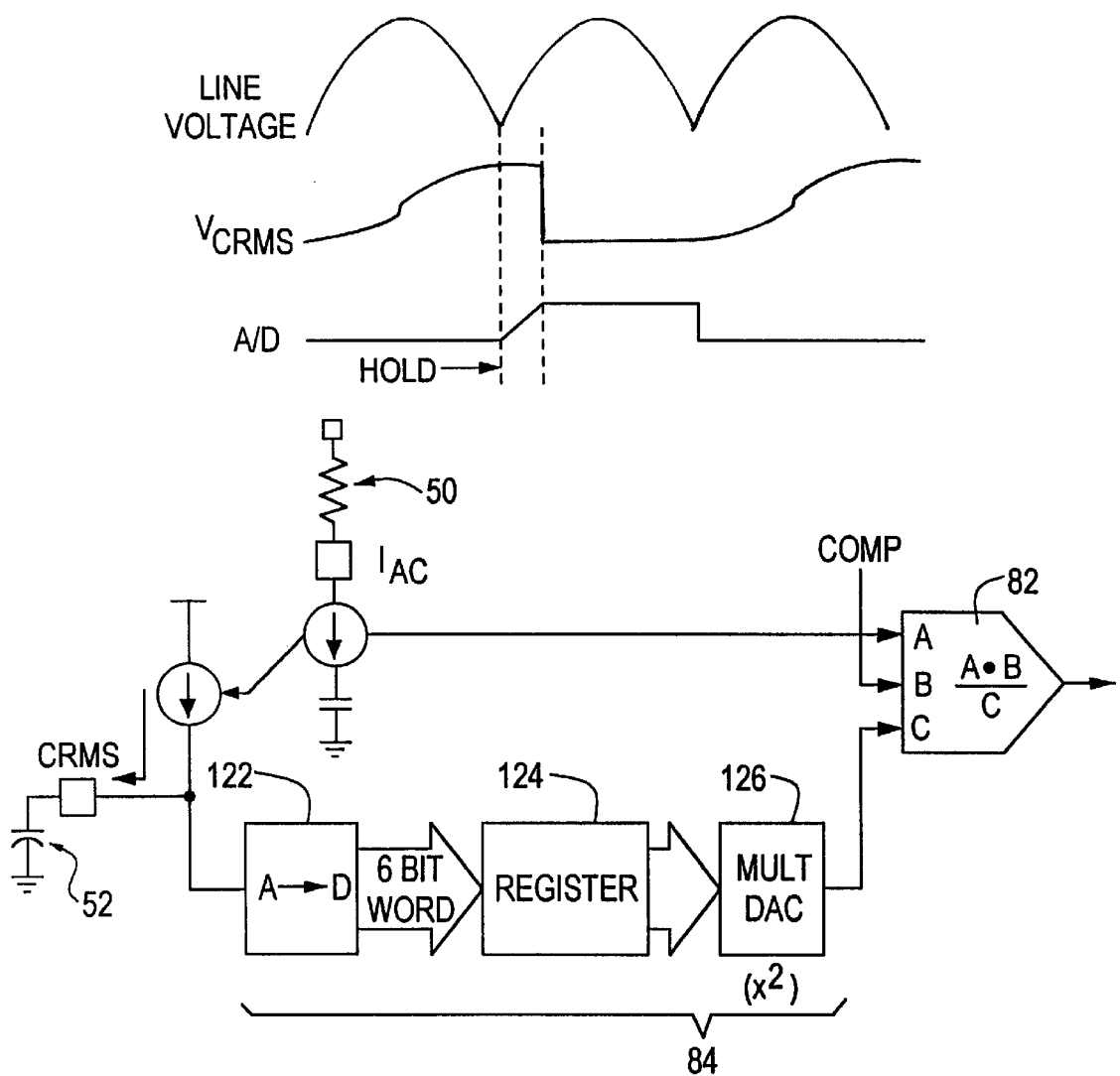
FIG. 7 is a schematic representation of an RMS detector for the controller shown in FIG. 5.

Referring to FIG. 7, there is shown a schematic representation of the internal RMS detector 84 in accordance with the present invention. The RMS detector 84 employs an RMS voltage sensing technique which takes advantage of the mixed signal capabilities allowed by a BiCMOS fabrication process. It combines an integrate and hold function with a 6 bit A-D converter 122 to extract the RMS value of the incoming line voltage and digitally "hold" it in a register 124 for a line cycle. The implementation extracts the RMS information directly from the IAC input current signal, which is needed by the ACU anyway, thereby eliminating the need for the external two pole filter 120.

The first stage of the RMS detector 84 mirrors the IAC current to coupling capacitor 52 for one half-cycle of the input line. Capacitor 52 ($C_{rms}$) charges to a voltage proportional to the average peak RMS value of the line according to the following equation:

$$V_{Crms} = \frac{I_{AC}(pk)}{2\omega C_{rms}} (1 - \cos\omega t)$$

Next, the current mirror is disconnected from capacitor 52 and the A-D converter 122 converts this voltage to a 6 bit digital word. The A-D converter 122 has a 4.0V full scale range, which yields a step resolution of 64 mV. The 6 bit word is then loaded into the register 124 and capacitor 52 is reset to zero volts in preparation for the next sample. The contents of the register 124 are output to a multiplying DAC 126 in order to produce the denominator term in the ACU transfer function of analog multiply and divide circuit 82. FIG. 7 also illustrates typical operational waveforms for the present invention RMS voltage sensing technique.

There are two important benefits of this technique of RMS voltage extraction. The RMS detector 84 samples and updates the RMS value at the line frequency, which is six times the bandwidth of the typical two stage filter approach. Since the hold function is digital, it is inherently ripple free. Reduction of ripple in the feed forward path improves the THD, but it also opens up the possibility of improving the overall bandwidth of the outer voltage loop. The low bandwidth of the outer voltage loop is a fundamental limitation of all conventional PFC converters, compounded by the need to minimize the contribution of the 120 Hz ripple from the output $V_{OUT}$. The improvement in bandwidth with the present invention RMS voltage sensing technique is possible because the contribution from the RMS distortion term is virtually eliminated, allowing the distortion producing component of the outer voltage loop to be increased. With higher outer voltage loop bandwidth, and allocation of higher ripple to the output $V_{OUT}$, smaller output filter capacitors can be specified, saving cost and space.

As shown in the waveforms of FIG. 4, the modified isolated boost converter circuit 40 requires drive signals for the two main (IGBT) switches Q3 and Q4 with certain timing relationships. The delay between turn-off of an IGBT and turnoff of the MOSFET can be programmed for the controller 42. In a PFC application, the input line varies from zero to the AC peak level, resulting in a wide range of required duty ratio.

A fixed delay time will induce line current distortion at the peaks of the AC line under high line and/or light load conditions. This is caused by the minimum controllable duty ratio imposed on the modulator by the fixed delay. If the minimum controllable duty ratio is fixed, the inner current loop can exhibit a limit cycle oscillation at the line peaks, inducing line current distortion.

Figure 8:
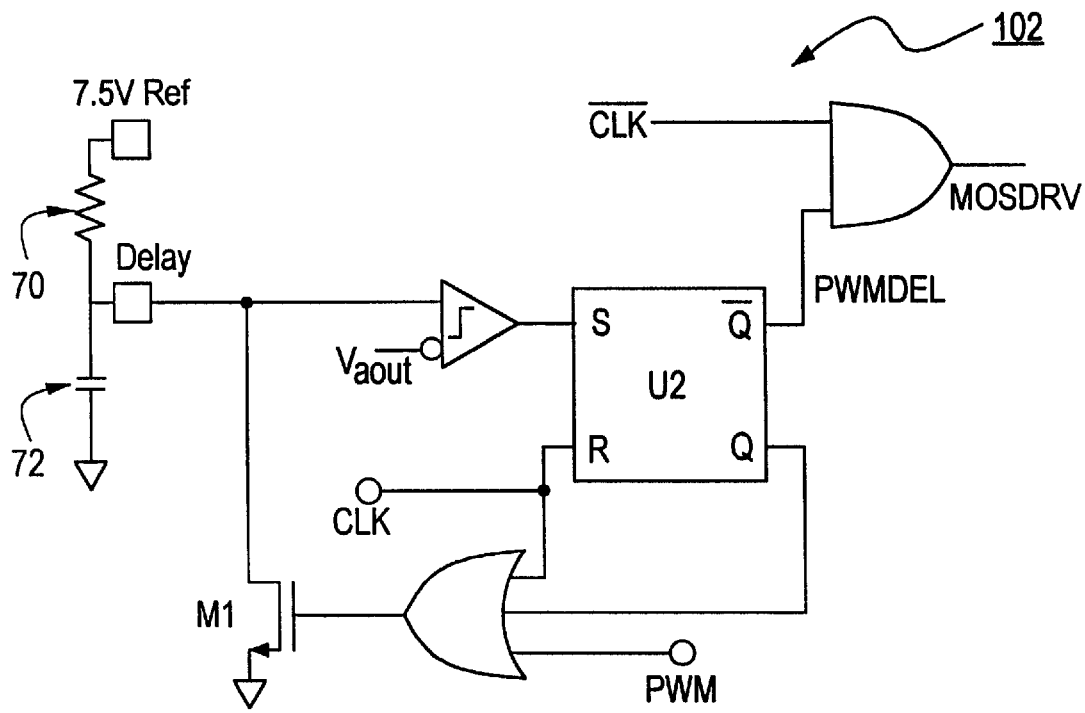
FIG. 8 is a schematic representation of a trailing edge delay circuit for the controller shown in FIG. 5.

Referring to FIG. 8, there is shown a schematic representation of the trailing edge delay circuit 102. The trailing edge delay circuit 102 operates as an adaptive MOSFET delay generator which is directly modulated by load power demand. That is, this circuit 102 directly varies the delay time based on the output voltage level of the voltage loop error amplifier 86 which in an average current mode PFC converter with line feed forward is indicative of load power. The delay time is programmed with resistor 70 and capacitor 72. The sequence of events starts when the internal CLK signal resets latch U2, causing PWMDEL to go high and the Q output to go low. Capacitor 72 is discharged via M1 and is held low until the internal PWM signal goes low (indicating turn-off of either of the IGBT drives). At this point M1 turns off and capacitor 72 charges towards the 7.5V reference through resistor 70. A comparator U1 compares this voltage to the output voltage (Vaout) of the voltage loop error amplifier 86. When the voltage on capacitor 72 is greater than Vaout, the latch U2 is set causing PWMDEL to go low. PWMDEL is logically ANDed with CLKNOT to produce the signal which commands the MOSFET driver output.

This technique reduces the overlap delay at light loads or high lines, but maintains a longer delay when the line voltage is low or the load is heavy. This, by definition, reduces the minimum controllable duty ratio to an acceptable level, and is programmable by the user. Reducing the delay time under light current conditions is acceptable since IGBT current is directly proportional to load current. By providing programming flexibility with resistor 70 and capacitor 72, the delay times cam be optimized for current and future classes of IGBT switches. The delay can also be set to zero by removing capacitor 72 from the converter circuit 40.

The controller 42 provides several additional features which ease the converter design. A soft-start function eases input di/dt, which in turn eases stress on output rectifiers. A zero current comparator 106 ensures that the converter circuit 40 delivers zero current when commanded by the voltage loop error amplifier 86. Previous controllers relied on a built-in or an externally induced offset voltage on the current error amplifier 88 to guarantee this condition. A peak current limiting feature prevents inductor current saturation during start-up conditions. Other features of the controller 42 include under voltage lock out (UVLO) circuitry 108 with several volts of hysteresis, and a system shutdown comparator 110 combined with the SS input.

For the isolated boost converter circuit 40, the key design considerations are related to the transformer design, switch selection, boost inductor design, and start-up and shutdown situations. While the steady-state transfer function of the isolated boost converter circuit 40 is similar to the transfer function of a conventional non-isolated boost converter (with turns ratio factor), the presence of extra switches makes the transient conditions considerably different. In particular, output diode conduction is possible only when one of the switches Q3 or Q4 is on.

During start-up and overvoltage/overcurrent situations, if both switches Q3 and Q4 are turned off, the inductor current has no means to discharge to the output $V_{OUT}$. A transformer winding 78 and a diode 80 are thus provided to allow the inductor L to discharge under fault conditions. The same circuit also provides a path to the output $V_{OUT}$ during start-up. The turns ratio for this auxiliary transformer is made to be equal to or larger than the turns ratio of the main transformer T1 in order to ensure that diode 80 stays off during normal operation. The input inductor L is designed to handle the peak input current which occurs at full load, low line peak conditions.

The turns ratio of the main transformer T1 is determined by the need for the primary side reflected output voltage to be larger than the peak of the high line input. As in other universal input PFC boost converters, this level meeds to be in the 385–400V range. For a 48V output, this means a turns ratio of 8:1. The coupling between the related primary and secondary windings should be very tight to prevent ringing.

Figure 9:
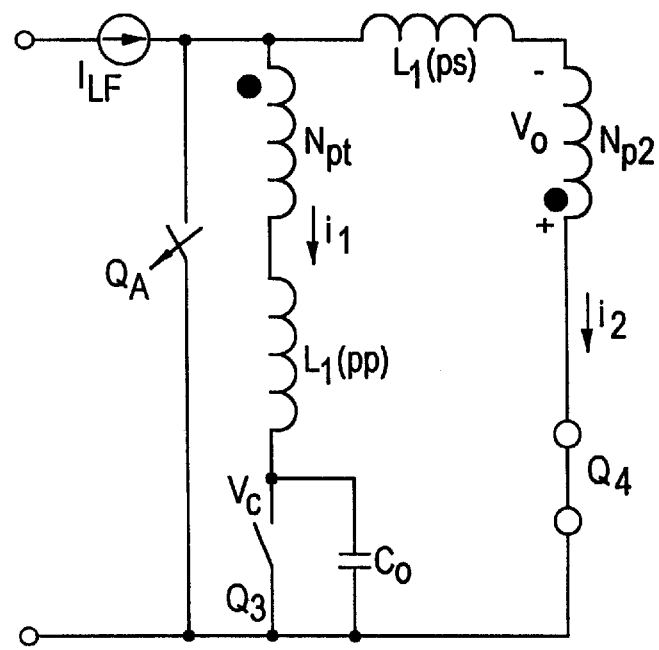
FIG. 9 is an equivalent circuit showing the coupling from the primary to the secondary for the isolated boost converter circuit shown in FIG. 3.

The peak voltage and current stresses of the IGBT switches Q3 and Q4 are depicted in FIG. 4. Without consideration of ringing, the peak stresses are twice the reflected output voltage and necessitate 900V or higher rating for the IGBT switches Q3 and Q4. In the available range of IGBT's for this application, a trade-off exists between faster switching speeds and lower forward drop. While the presence of the MOSFET switch QA allows lossless turn-off, it is still desirable to use fast or ultrafast IGBT's for switching frequencies in the 100 kHz range to prevent the delay from becoming a very large portion of the available duty cycle. It should be noted that in this application, the switching frequency of the IGBT switches Q3 and Q4 is half the switching frequency of the MOSFET switch QA (which is also the inductor ripple frequency). The MOSFET switch QA used in this application is rated at half the peak voltage of the IGBT switches Q3 and Q4 and also does not carry current for most of the cycle. However, when it carries current (during the programmed delay period), its peak current is equal to the peak inductor current. The sizing of the MOSFET switch QA should be such that it can handle the desired peak current while still being able to switch off very fast. The waveforms in FIG. 4 depict steady state operation in the absence of any leakage inductance in the transformer T1. However, the high turns ratio and the complex winding structure of the transformer T1 results in significant leakage effects between windings. The isolation requirements of the output also contribute to the leakage. The higher voltage stresses and contribute to power loss and EMI. While the coupling between primaries is important, the coupling from the primary to secondary is even more critical. This can be understood by analyzing the circuit behavior when the MOSFET switch QA turns off. At that point, only one IGBT switch Q3 or Q4 is on and a corresponding output diode 44 or 46 is about to turn on. The equivalent circuit at this point is shown in FIG. 9. For the purpose of this analysis, the input inductor current can be assumed to be constant at $I_{LF}$.

Unlike conventional boost converters, when the MOSFET switch QA is turned off, current takes longer to transfer to an output diode due to the presence of leakage inductance. In addition, current initially transfers to both the windings if the primary to secondary leakage inductance is significant. As a result of current in the non-conducting branch (Q3 in FIG. 9), there is resonance between the leakage inductance and parasitic capacitance of the IGBT switch Q3 which increases the voltage stresses. Assuming that the input inductor current ILF is equally divided between the two branches initially, the resonant circuit equations for the first half cycle are given by $$i_1 = \frac{I_{LF}}{2} \cos\omega t + \frac{2V_o}{\omega L} \sin\omega t$$

$$v_c = 2V_o(1 - \cos\omega t) + \frac{\omega L I_{LF}}{2} \sin\omega t$$

wherein L (equivalent inductance) and $\omega$ are given by $$L = L_1(pp) + 2L_1(ps)$$

$$\omega = \sqrt{\frac{1}{LC_o}}$$

From the above equations, it can be seen that higher L contributes to higher ringing at $v_c$. By increasing the value of $C_0$, this ringing can be snubbed, but that leads to higher losses at the turn-on of the IGBT switch Q3 or Q4. Also, a lower natural impedance of the circuit (achieved with low L or high $C_0$), has a negative impact on the value of $i_1$. Hence, careful trade-offs must be made to prevent excessive dissipation during this transition.

Because of the isolation provided by the converter circuit 40, the output rectifiers 44 and 46 see lower voltage and higher current stresses. However, lower voltage stresses are a highly favorable condition for the minimization of reverse recovery effects for these rectifiers. A wide variety of rectifiers are available for desired current levels at the typical voltage rating of 200V for the intended 48V application.

The requirements for the output capacitor $C_F$ of the isolated boost converter circuit 40 are somewhat more demanding. It is a demonstrated fact that the energy storage function of the capacitor $C_F$ is more easily accomplished at higher voltage levels. The capacitance required for the same hold-up time increases inversely with the square of the output voltage for the same level of percentage ripple and output power requirements. In addition, for PFC circuits, the output capacitor $C_F$ is required to be large enough to handle the 120 Hz ripple which cannot be attenuated by the power stage. Another consideration for 48V systems is the voltage rating on the output capacitor $C_F$. Because of the considerable 120 Hz ripple, a 50V rating is not practical and a higher voltage rating is needed. It should be remembered that the output capacitor $C_F$ in this case replaces a boost capacitor and an output filter capacitor in a conventional two step front end converter. This offers significant cost and space savings compared to the conventional approach.

An experimental universal (85 to 264VAC) input, 40V–250 W output isolated boost converter with power factor correction was designed using the circuit design considerations outlined above. The key component choices were as follows:

IGBT Switches Q3 and Q4: IRGPH40F, 1200V, 29A
MOSFET Switch QA: IRF840, 500V, 0.85 ohm
Output Diodes: IR10CTF20
LF: 40T/4T (Metglas MicroLite MP3510PDGC core)
$C_F$: 4700 μF, 50V Aluminum Electrolytic Capacitors
T: Magnetics R material, ETD49 core (40 turns each primary, 4 turns each secondary, interleaved P1-S1-P1-P2-S2-P2)

The power stage required accurate timing control and proper snubbing to yield expected results. In particular, the turn-on of the IGBT switches Q3 and Q4 with respect to the turn-on of the MOSFET switch QA had to be accurately slowed down to prevent large current spikes caused by high dv/dt's. The operational waveforms of the isolated boost converter are shown in FIG. 10.

Figure 10:
FIG. 10 shows representative voltage waveforms for the power stage of the isolated boost converter circuit shown in FIG. 3.

FIG. 10 depicts representative voltage waveforms for the power stage including the gate waveforms of the MOSFET switch QA and the IGBT switch Q3 and their drain and collector voltages, respectively. As seen from the waveforms, inductive ringing (due to leakage inductance) contributes to additional voltage stress on the devices.

Given the complexity of the isolated boost converter circuit 40, it is clear that the controller 42 greatly simplifies its practical implementation. The controller 42 primarily provides accurate and easy control of the isolated boost converter circuit 40. The controller 42 also provides additional performance enhancements in terms of improved RMS voltage sensing and adaptable MOSFET turn-off delay. With these enhancements, the controller 42 enables the implementation of a single stage isolated, power factor corrected front-end power supply with lower harmonic distortion at light loads, improved dynamic feed forward response, and potentially higher bandwidth for the voltage feedback loop.

The present invention is not to be limited in scope by the specific embodiments described herein. Indeed, various modifications to the present invention, in addition to those described herein, will be apparent to those of skill in the art from the foregoing description and accompanying drawings. Thus, such modifications are intended to fall within the scope of the appended claims.

What is claimed is:

1. An RMS detect and conditioning circuit for a power factor correction controller, said RMS detect and conditioning circuit comprising:

storage means responsive to a current signal associated with a rectified AC input line voltage signal for storing a voltage signal proportional to the average value of said rectified AC input line voltage signal over at least one cycle;

first conversion means responsive to said stored voltage signal for providing a digital signal corresponding to said stored voltage signal; and second conversion means responsive to said digital signal for providing an analog signal to an analog computational circuit for further processing consistent with power factor correction between said rectified AC input line voltage signal and said associated current signal.

2. The RMS detect and conditioning circuit as defined in claim 1, further comprising:

mirroring means responsive to said current signal associated with said rectified AC input line voltage signal for providing a mirrored current signal.

3. The RMS detect and conditioning circuit as defined in claim 1, further comprising:

processing means responsive to said digital signal for providing a mathematically transformed analog signal to said analog computational circuit.

4. The RMS detect and conditioning circuit as defined in claim 1, wherein said storage means comprises a charging capacitor.

5. The RMS detect and conditioning circuit as defined in claim 1, wherein said first conversion means comprises an analog to digital converter.

6. The RMS detect and conditioning circuit as defined in claim 1, wherein said second conversion means, comprises a digital to analog converter.

7. A method for detecting and conditioning RMS information for a power factor correction controller, said method comprising the steps of:

storing a voltage signal proportional to the average value of a rectified AC input line voltage signal over at least one cycle;

converting said stored voltage signal into a digital signal corresponding to said stored voltage signal; and converting said digital signal into an analog signal for further processing by an analog computational circuit consistent with power factor correction between said rectified AC input line voltage signal and a current signal associated with said rectified AC input line voltage signal.

8. The method as defined in claim 7, further comprising the step of:

mirroring the current signal associated with said rectified AC input line voltage signal to generate a mirrored current signal; and charging a storage capacitor with said mirrored current signal so as to provide said stored voltage signal.

9. The method as defined in claim 7, further comprising the step of:

processing said digital signal according to a mathematical function.

10. A delay circuit for controlling the time at which a low power transition switch switches in an isolated boost converter circuit having at least one high power boost switch, said delay circuit comprising:

signal processing means responsive to a feedback signal in the isolated boost converter circuit for providing a load signal indicative of an output load of said isolated boost converter circuit;

reference means responsive to a transition signal indicating an off transition of the high power boost switch in said isolated boost converter circuit for providing a first reference signal;

comparing means for comparing said load signal and said first reference signal; and switching the low power transition switch at a time determined by the comparison between the load signal and the first reference signal.

11. The delay circuit as defined in claim 10, wherein said signal processing means comprises an error amplifier for amplifying the difference between said feedback signal and a second reference signal.

12. The delay circuit as defined in claim 10, wherein said reference means comprises a charge storing device, a charging device for charging the charge storing device at a predetermined rate, and a discharging device for discharging the charge storing device substantially instantaneously in response to the transition signal.

13. The delay circuit as defined in claim 12, wherein said charge storing device is a capacitor.

14. The delay circuit as defined in claim 12, wherein said charging device is resistor connected between a voltage reference and the charge storing device.

15. The delay circuit as defined in claim 12, wherein said discharging device is a switch.

16. The delay circuit as defined in claim 14, wherein said charge storing device is a capacitor.

17. The delay circuit as defined in claim 10, wherein said comparing means comprises a comparator.

18. The delay circuit as defined in claim 10, further comprising logic means responsive to said control signal for providing a switching signal for switching said low power transition switch in said isolated boost converter circuit.

19. The delay circuit as defined in claim 18, wherein said logic means comprises a latch.

20. A method for controlling the time at which a low power transition switch switches in an isolated boost converter circuit having at least one high power boost switch, said method comprising the steps of:

processing a feedback signal in the isolated boost converter circuit;

providing a load signal indicative of an output load of said isolated boost converter circuit based upon said processed feedback signal;

providing a reference signal following an off transition of the high power boost switch in said isolated boost converter circuit;

comparing said load signal and said reference signal; and switching the low power transition switch at a time determined by the comparison between the load signal and the reference signal.

21. A controller for use as part of a switching preregulator providing substantially DC output power from rectified AC line power, comprising:

a pulse-width modulator operative to generate high-frequency switch-control signals to be supplied to switching elements in the preregulator, the respective duty cycles of the switch-control signals varying in response to the magnitude of a current control signal;

a multiply-divide circuit operative to generate the current control signal such that the value of the current control signal is proportional to the product of an error signal and a feedforward signal divided by a distortion-reducing signal, the error signal representing the deviation of the actual preregulator output voltage from a desired DC preregulator output voltage, the feedforward signal being proportional to the rectified AC line voltage;

an integrate-and-hold circuit operative during each cycle of the AC line power to integrate the feedforward signal over one half of the cycle and to hold the integrated value over the other half of the cycle;

an A/D converter operative to convert the value held by the integrate-and-hold circuit to a digital value;

a register operative during each cycle of the AC line power to store the digital value from the A/D converter; and a multiplying D/A converter continually operative to generate the distortion-reducing signal such that the value of the distortion-reducing signal is proportional to the square of the value stored in the register.

* * * * *